United States Patent [19]

Mitchell

[11] Patent Number: 4,487,905
[45] Date of Patent: Dec. 11, 1984

[54] WETTABLE SILICONE RESIN OPTICAL DEVICES AND CURABLE COMPOSITIONS THEREFOR

[75] Inventor: Darrell D. Mitchell, Midland, Mich.

[73] Assignee: Dow Corning Corporation, Midland, Mich.

[21] Appl. No.: 475,270

[22] Filed: Mar. 14, 1983

[51] Int. Cl.$^3$ .............................................. C08G 77/06
[52] U.S. Cl. .................................. 528/15; 351/160 R; 351/160 H; 526/279; 528/31; 528/32; 525/478
[58] Field of Search ....................... 351/160 R, 160 H; 526/279; 528/15, 31, 32; 525/478

[56] References Cited

U.S. PATENT DOCUMENTS

| | | | |
|---|---|---|---|
| 2,922,806 | 1/1960 | Merker | 260/448.2 |
| 3,808,178 | 4/1974 | Gaylord | 260/86.1 E |
| 3,925,178 | 12/1975 | Gesser et al. | 204/165 |
| 4,035,355 | 7/1977 | Baney | 260/46.5 Y |
| 4,120,570 | 10/1978 | Gaylord | 351/40 |
| 4,152,508 | 5/1979 | Ellis et al. | 526/279 |
| 4,198,131 | 4/1980 | Birdsall et al. | 351/160 R |
| 4,235,985 | 11/1980 | Tanaka | 526/279 |
| 4,280,759 | 7/1981 | Neefe | 351/160 R |
| 4,306,042 | 12/1981 | Neefe | 526/75 |
| 4,414,375 | 11/1983 | Neefe | 526/260 |
| 4,424,328 | 1/1984 | Ellis | 526/279 |

FOREIGN PATENT DOCUMENTS

| | | |
|---|---|---|
| 2023628 | 1/1980 | United Kingdom . |
| 2111241 | 6/1983 | United Kingdom . |
| 2117387 | 10/1983 | United Kingdom . |

*Primary Examiner*—Melvyn I. Marquis
*Attorney, Agent, or Firm*—Richard E. Rakoczy

[57] ABSTRACT

This invention provides novel compositions curable to resins and particularly provides oxygen permeable, inherently wettable optical devices useful as eye contact or intraocular lenses. The lenses are composed of a cured polysiloxane resin having an advancing water-in-air contact angle of no greater than 80°. The polysiloxane resin is prepared from a catalyzed mixture of an acrylate-functional polysiloxane composition and an organosilicon cross-linking agent containing silicon hydride radicals. The acrylate-functional polysiloxane composition contains a sufficient amount of aliphatically unsaturated hydrocarbon radicals (e.g., vinyl radicals) other than acrylate-functional radicals to enable that composition to react on a mole to mole basis with the cross-linking agent to produce a cured polysiloxane resin. To provide the desired level of surface wettability, the acrylate-functional polysiloxane composition also contains an effective amount, typically from 7 to 30 mole percent of the total moles of siloxane units present in the cured polysiloxane resin, of $H_2C=CRCOOR'SiO_{1.5}$ units to provide the aforementioned advancing water-in-air contact angles. The catalyzed mixture only contains a sufficient amount of cross-linking agent to react with the aliphatically unsaturated hydrocarbon radicals other than the acrylate-functional radicals and thus enables the unreacted acrylate-functional siloxane units to provide the desired wettability characteristics to the cured polysiloxane resin.

20 Claims, No Drawings

WETTABLE SILICONE RESIN OPTICAL DEVICES AND CURABLE COMPOSITIONS THEREFOR

BACKGROUND OF THE INVENTION

The invention relates to novel compositions curable to transparent, oxygen permeable polysiloxane resins. The cured resins are hydrophilic and inherently wettable by human tear fluid because they contain a specific-type and an effective amount of certain acrylate-functional siloxane units to provide a certain degree of surface wettability. This invention specifically relates to hydrophilic inherently wettable optical devices such as eye contact or intraocular lenses manufactured from such resins.

Oxygen permeable, hard silicone (polysiloxane) resin optical devices manufactured from phenyl-containing polysiloxane resins are described in U.S. Pat. No. 4,198,131 to Birdsall, et al. (issued Apr. 15, 1980) which is hereby incorporated by reference. Silicone materials can possess a high degree of oxygen permeability and this property makes such materials highly desirable for use as eye contact lenses. Hard silicone resin contact lenses of the Birdsall, et al. type are also desirable for the correction of significant amounts of astigmatism because the hard lens does not conform to the shape of the cornea in the manner that soft contact lenses typically do. The silicone resin materials taught by Birdsall, et al. have a disadvantage in that the surfaces of such silicone resins are not considered to be inherently wettable by water or by human tear fluid.

Human tear fluid contains mucus and other components which tend to render surfaces to which the tear fluid is exposed more wettable by the aqueous tear fluid than by water alone. Thus, a material which may only be marginally wettable by water may be completely wetted by human tear fluid and would therefore be useful as, for example, a corneal contact lens material without further modification. The composition of human tear fluid varies from person to person and may even vary from day to day for the same person depending upon the general health of the individual. Thus, individuals will vary in their ability to have their tear fluid "wet" the surface of a contact lens and it must be recognized that what may be an "inherently wettable" contact lens for some individuals may not be "inherently wettable" for others. The Birdsall, et al. patent states that in order for the lens to perform well in the eye, it must be made "hydrophilic" and that can be accomplished by means of the Gesser, et al. plasma treatment process of U.S. Pat. No. 3,925,178 (issued Dec. 9, 1975) or by some other standard technique.

The terms "hydrophilic" and "hydrophobic" are often used in the field of eye contact lenses to describe the surface wettability of the devices, but those terms have been given many meanings. As noted above, individuals vary in their ability to wet the surfaces of eye contact lenses, so the best way to define a material which is "inherently wettable by human tear fluid" for the purposes of this invention appears to be to define a "hydrophilic" cured polysiloxane resin as being one which possesses an advancing water-in-air contact angle of no greater than 80° at room temperature (21°±2°) while a "hydrophobic" cured polysiloxane resin is defined to be one which possesses an advancing water-in-air contact angle of greater than 80° at room temperature. The contact angle measurements are made using distilled water on the surface of a disk of resin or a resin lens which has been equilibrated (hydrated) with an aqueous liquid such as water or isotonic saline. The preferred method for obtaining a hydrated disk of resin or resin lens surface involves heating the article in distilled water or aqueous isotonic saline solution to about 80° C. for about 15 to 30 minutes in one of a number of well known and commercially available eye contact lens heat disinfector (aseptor) units used to sterilize eye contact lenses. Thus, if a biocompatible polysiloxane lens material as described herein is found to be "hydrophilic", this is taken to mean that it is reasonable to go further and to empirically confirm that the material possesses an effective amount of acrylate-functional siloxane units such that its surfaces are "inherently wettable by human tear fluid" for the purposes of this invention. This can be done by inserting a sterile, hydrated lens manufactured from that resin material to the wearer's prescription on the corneae of several patients. The surface of the lens is visually observed after placement on the eye to ascertain whether or not the lens surface either is capable of holding a precorneal tear film for a period of time that is at least equal to 4 to 5 seconds—which corresponds to the average time between consecutive blinks of a human eye, i.e., about 12 blinks per minute—or possesses a lens front surface tear film evaporation time of at least 10 seconds when the eye is held open after a continuous tear film has formed over the front surface. If either of the latter two empirical observations are met and the wearer has an acceptable level of visual acuity, then the lens material is deemed to be "inherently wettable by human tear fluid" for that wearer for the purposes of this invention.

The surface treatment hydrophilization process of Gesser, et al. renders the Birdsall, et al. polysiloxane resins wettable to a short depth from the lens surface and thereby capable of being worn, but it leaves the underlying substrate hydrophobic. That is a disadvantage because in the event that the contact lens should become scratched or if an eye care practitioner should later desire to reshape the lens to better conform the lens to the wearer's eye by reshaping the surface, such occurrences can result in exposure of the hydrophobic substrate and necessitate another surface treatment to again make the lens wettable and suitable for wear. Prior to surface treatment, a phenylpolysiloxane resin of the Birdsall, et al. type was found to have an advancing water-in-air contact angle of greater than 100° both before and after hydration.

Hard contact lenses manufactured from polymethylmethacrylate alone can be tolerated in the eye for reasonably long periods of time (reported "water" contact angles range from about 55°-65°), but this very well known organic hard contact lens material is not considered to be oxygen permeable and is sometimes referred to in the literature as being a hydrophobic material. Other organic monomers such as 2-hydroxyethyl methacrylate which contain hydrophilic hydroxyl groups can be employed to impart inherent and/or increased wettability to hard organic contact lens materials since the hydrophilic groups are dispersed throughout the polymeric lens material. However, such hard materials do not possess the oxygen permeability obtainable from silicone materials of the Birdsall, et al. type.

In an attempt to obtain a hard contact lens material that rivalled the oxygen permeability of the silicone materials and was also inherently wettable, eye contact lenses made from copolymers of oxygen permeable siloxanyl alkyl ester monomers and less oxygen permeable organic unsaturated monomers such as esters of acrylic and methacrylic acid have been taught such as those found in U.S. Pat. Nos. 3,808,178 (Gaylord, issued Apr. 30, 1974), 4,120,570 (Gaylord, issued Oct. 17, 1978) and 4,152,508 (Ellis, et al., issued May 1, 1979). Tanaka, in U.S. Pat. No. 4,235,985 (issued Nov. 25, 1980), teaches the use of hydrophilic radicals such as hydroxyl on the organic substituents present in the acrylate-functional siloxanes to provide inherent wettability. Copolymers of a polymerized reactive organosilane such as $CH_2=C(CH_3)COO(CH_2)_3Si(OCH_3)_3$ and monomeric methyl methacrylate are taught in U.S. Pat. No. 4,280,759 (Neefe, issued July 28, 1981).

Other compositions containing acrylate-functional siloxane units which are curable to resins or useful as intermediates can be seen from an examination of U.S. Pat. Nos. 2,922,806 (Merker, issued Jan. 26, 1960) and 4,035,355 (Baney, et al., issued July 12, 1977) and U.K. Patent Application GB 2,023,628 (Berg, published Jan. 3, 1980). None of these teach contact lens uses for the compositions and products described therein.

During the course of my attempts to develop an inherently wettable, highly oxygen permeable polysiloxane resin, I discovered that certain acrylate-functional polysiloxane compositions which contained at least 30 mole percent of acrylate-functional siloxane units of the unit formula $H_2C=CRCOOR'SiO_{1.5}$ (R is a methyl radical or hydrogen and R' is a divalent alkylene radical of from 1 to 4 inclusive carbon atoms) could be cured alone or in the presence of certain aliphatically unsaturated organic compounds to form oxygen permeable polysiloxane or polysiloxane/organic copolymer resins which possessed water-in-air contact angles which were similar to those possessed by hard polymethylmethacrylate resins. These compositions, resins and optical devices made therefrom are the subject of U.S. patent application Ser. No. 376,450 to Darrell D. Mitchell entitled "Inherently Wettable Silicone Resin Optical Devices" that was filed on May 10, 1982 and assigned to the same assignee as the present invention (hereby incorporated by reference). In that Patent Application, a specific type of acrylate-functional siloxane unit was found to produce inherently wettable resins when at least 30 mole percent of such units were present in the polysiloxane composition. That acrylate-functional siloxane unit was used both as a reactive cross-linking agent to cure the resin and to provide wettability. The presence of additional alkyl groups bonded by means of carbon-silicon bonds to the same silicon atom bearing the acrylate-functional radical was found to result in a cured polysiloxane resin with an advancing water-in-air contact angle of greater than 80°, and more often, greater than 90°. The same result was observed when less than 30 mole percent of the aforementioned acrylate-functional siloxane units were used to produce a cured polysiloxane resin.

All of the compositions used in the above patents and the Patent Application are generally cured in such a manner that substantially all of the aliphatically unsaturated radicals present are reacted. For example, the use of a free-radical polymerization method such as a peroxide catalyst will result in reaction with as many reactive radicals as are present in the composition assuming that a sufficient amount of peroxide is employed and that the reactive radicals are available for reaction.

The novel compositions of the present invention employ a specific type of acrylate-functional siloxane unit to render the surface of the cured composition hydrophilic and thereby inherently wettable by human tear fluid. The curing of the composition is accomplished in such a manner that the acryloxy or methacryloxy radicals found in the acrylate-functional siloxane units present in the composition remain essentially unreacted after curing and are therefore available to render the cured polysiloxane resin hydrophilic and inherently wettable. The use of the hereinafter described acrylate-functional siloxane units to provide wettability is novel.

The present invention is based upon the unexpected observation that oxygen permeable cured polysiloxane resins which possess an advancing water-in-air contact angle of no greater than 80° after hydration and are inherently wettable by human tear fluid can be prepared from polysiloxane compositions possessing less than a total of 30 mole percent of acrylate-functional siloxane units of the unit formula $H_2C=CRCOOR'SiO_{1.5}$ when such compositions are cured by means of a Group 8 Transition Metal catalyzed addition of $\equiv SiH$ radicals to aliphatically unsaturated hydrocarbon radicals attached to siloxane units other than the $H_2C=CRCOOR'SiO_{1.5}$ units. As will now be described further, polysiloxane compositions containing an effective amount, generally a total of from 7 to less than 30, preferably from 10 to 20 mole percent, of such acrylate-functional siloxane units can be employed to produce inherently wettable resins, thereby leaving the resin formulator with a wider latitude for selecting other siloxane units which ultimately affect the physical properties of the cured resins. As described, infra, it was also observed that when compositions of the present invention were provided with a sufficient amount of additional $\equiv SiH$ polysiloxane cross-linking agent to react with all of the siloxane units bearing aliphatically unsaturated hydrocarbon radicals, including the acrylate-functional siloxane units, the advancing water-in-air contact angle was found to exceed 80° after hydration. That observation is consistent with the results found in U.S. Ser. No. 376,450, above, for polysiloxane resins containing less than 30 mole percent of the above acrylate-functional siloxane units.

It is one object of this invention to provide novel compositions which are capable of being cured to transparent, oxygen permeable, hydrophilic polysiloxane resins having an advancing water-in-air contact angle of no greater than 80° at 21°±2° C. after hydration.

It is another object of this invention to provide a biocompatible, hard, oxygen permeable polysiloxane resin optical device, particularly in the form of an eye contact lens, having an oxygen gas permeability coefficient of at least $2\times10^{-10}(cm^3.cm)/(cm^2.sec.cm\ Hg)$ which results in a calculated open eye Equivalent Oxygen Performance (EOP) value of at least 3 percent at 0.1 mm thickness at 21°±2° C. which is inherently wettable by human tear fluid without any necessity for the further inclusion of a source of hydrophilic groups such as hydroxyl or poly(alkyleneoxy) groups into the formulation. Such optical devices do not require surface treatments such as plasma treatment during their manufacture to render the surfaces thereof wettable by human tear fluid. The elimination of such an extra manufacturing step results in a reduction in manufacturing costs and also enables an eye care practitioner to subsequently alter the surface of the lens without necessitating retreatment of the lens to restore its wettability by human tear fluid. These lenses can be plasma surface-treated by means of the process shown in the Gesser, et al. Patent to further improve the hydrophilicity of the lens surface. Surface-treated lenses of the present invention still possess the advantage of the high oxygen permeability of silicone resins coupled with the advantage that if the lens should be scratched or modified, the underlying substrate exposed is hydrophilic after hydration instead of being hydrophobic as is the case with lenses of the type taught in the Birdsall, et al. Patent. Lenses of the present invention require no organic comonomers which tend to reduce the oxygen permeability of the lens and can therefore possess the maximum oxygen permeability attainable with the polysiloxane components selected to prepare the curable compositions.

In a more preferred embodiment, this invention provides a hard polysiloxane resin optical device suitable for use as an extended or continuous wear eye contact lens because it possesses an oxygen gas permeability coefficient of at least $8 \times 10^{-10} (cm^3 \cdot cm)/(cm^2 \cdot sec \cdot cm\ Hg)$ which results in a calculated open eye Equivalent Oxygen Performance value of at least 10 percent at 0.1 mm thickness.

DETAILED DESCRIPTION OF THE INVENTION

The above and other objects of the present invention are provided by a curable polysiloxane composition consisting essentially of (A) 100 parts by weight of an acrylate-functional polysiloxane composition containing acrylate-functional siloxane units of the unit formula $H_2C=CROOR'SiO_{1.5}$ where R is a methyl radical or hydrogen and R' is a divalent alkylene radical of from 1 to 4 inclusive carbon atoms and containing siloxane units possessing aliphatically unsaturated hydrocarbon radicals selected from the group consisting of vinyl, allyl and butenylene radicals, the remaining silicon-bonded substituents in addition to divalent oxygen radicals present in said polysiloxane essentially being selected from the group consisting of alkyl radicals of from 1 to 3 inclusive carbon atoms and phenyl radicals, (B) an amount of organosilicon cross-linking agent containing an average of at least two silicon-bonded hydrogen radicals per molecule, said amount being no greater than that required to provide a 1:1 mole ratio of silicon-bonded hydrogen radicals to total moles of said aliphatically unsaturated hydrocarbon radicals present in (A), essentially any remaining substituents in addition to divalent oxygen radicals present in said agent being selected from the group consisting of alkyl radicals of from 1 to 3 inclusive carbon atoms and phenyl radicals, and (C) a catalytic amount of a Group 8 Transition Metal catalyst which preferentially catalyzes the addition of said silicon-bonded hydrogen radicals to said aliphatically unsaturated hydrocarbon radicals instead of the $>C=C<$ portion of the acrylate-functional siloxane units, there being at least a sufficient amount of said aliphatically unsaturated hydrocarbon radicals in (A) such that when the mixture of (A), (B) and (C) is cured to form a resin, said resin possesses a flexural strength value of at last 3,500 p.s.i. at $21°\pm2°$ C. in the unhydrated state, there further being an effective amount of said acrylate-functional siloxane units present in (A) such that the cured resin possesses an advancing water-in-air contact angle of no greater than 80° at $21°\pm2°$ C. in the hydrated state.

This invention further relates to an optical device which is a lens to be worn against or inside of the eye, said lens consisting essentially of an optically clear, biocompatible, cured polysiloxane resin having a flexural strength value of at least 3,500 p.s.i. at $21°\pm2°$ C. in the unhydrated state, an advancing water-in-air contact angle of no greater than 80° at $21°\pm2°$ C. in the hydrated state and an oxygen gas permeability coefficient of at least $2 \times 10^{-10} (cm^3 \cdot cm)/(cm^2 \cdot sec \cdot cm\ Hg)$ which results in a calculated open eye Equivalent Oxygen Performance value of at least 3 percent at 0.1 mm thickness at $21°\pm2°$ C., said resin having been prepared by curing a composition consisting essentially of (A) 100 parts by weight of an acrylate-functional polysiloxane composition containing acrylate-functional siloxane units of the unit formula $H_2C=CROOR'SiO_{1.5}$ where R is a methyl radical or hydrogen and R' is a divalent alkylene radical of from 1 to 4 inclusive carbon atoms and containing siloxane units possessing aliphatically unsaturated hydrocarbon radicals selected from the group consisting of vinyl, allyl and butenylene radicals, the remaining silicon-bonded substituents in addition to divalent oxygen radicals present in said polysiloxane essentially being selected from the group consisting of alkyl radicals of from 1 to 3 inclusive carbon atoms and phenyl radicals, (B) an amount of an organosilicon cross-linking agent containing an average of at least two silicon-bonded hydrogen radicals per molecule, said amount being no greater than that required to provide a 1:1 mole ratio of a silicon-bonded hydrogen radicals to total moles of said aliphatically unsaturated hydrocarbon radicals present in (A), essentially any remaining silicon-bonded substituents in addition to divalent oxygen radicals present in said agent being selected from the group consisting of alkyl radicals of from 1 to 3 inclusive carbon atoms and phenyl radicals, and (C) a catalytic amount of a Group 8 Transition Metal catalyst which preferentially catalyzes the addition of said silicon-bonded hydrogen radicals to said aliphatically unsaturated hydrocarbon radicals instead of the $>C=C<$ portion of the acrylate-functional siloxane units, there being at least a sufficient amount of said aliphatically unsaturated hydrocarbon radicals in (A) such that when the mixture of (A), (B) and (C) is cured to form a resin, said resin possesses the aforementioned flexural strength value, there further being an effective amount of said acrylate-functional siloxane unit present in (A) such that the cured resin possesses the aforementioned water-in-air contact angle and is inherently wettable by the tear fluid of a wearer of such a lens.

Among the aforementioned optical devices included within the scope of the present invention are eye contact lenses such as scleral contact lenses, corneal contact lenses and intraocular lenses.

The term "consisting essentially of" means that the device is composed primarily of the hereinafter defined polysiloxane resin, but may contain minor amounts of other ingredients such as dyes, stabilizers and other ingredients which do not change the essential character of the device.

The term "essentially" in reference to silicon-bonded substituents means that the polysiloxane compositions which are composed of siloxane units and the cross-linking agents can contain small amounts of other organic substituents on the silicon atoms which do not materially affect the functioning of the composition to cure to a clear hard material suitable for fabricating lenses.

The term "optically clear" means that for use as a lens, the cured resin must be sufficiently transmissive of visible light and free of noticeable haze to be acceptable for use as an optical device. For example, materials having a luminous transmittance value of at least 85 percent (CIE Source D) measured using a typical lens thickness of the material according to the procedure set forth in ASTM D 1003-61 would be considered as being optically clear materials.

The term "biocompatible" means that the device must be capable of being used for contact with the human body as evidenced by testing in accordance with in vitro and in vivo testing procedures normally used to determine such biocompatibility.

Methods for making acrylate-functional polysiloxane compositions, including compositions of the above-described specific types, are known. For example, the compositions described in U.S. Pat. No. 4,035,355 (hereby incorporated by reference) can be modified by substitution of an appropriate amount of aliphatically unsaturated silanes for other silanes which are not acrylate-functional to obtain acrylate-functional polysiloxanes useful in the present invention.

It was found that, based upon the total moles of silicon atoms present in the mixture of acrylate-functional polysiloxane and organosilicon cross-linking agent, the mixture must contain an effective amount of acrylate-functional siloxane units of the unit formula $H_2C=CRCOOR'SiO_{1.5}$ to result in a cured polysiloxane resin that is considered to be "hydrophilic" and, especailly for eye contact lens use, capable of being inherently wettable by tear fluid of a wearer.

The lower limit of acrylate-functional polysiloxane units is about the minimum which can be used to obtain eye contact lenses which are inherently wettable by the tear fluid of at least a small number of patients since not all patients have the same tear fluid composition and some patients will have, for example, longer front surface evaporation times than others because of that fact. However, this lower amount may be quite satisfactory for intracoular lens use. Specifically, a mixture of acrylate-functional polysiloxane and organosilicon cross-linking agent which contains at least 7 mole percent of said acrylate-functional siloxane units typically results in a cured resin having an advancing water-in-air contact angle of no greater than 80° after hydration. Especially when eye contact lens use is contemplated, it is preferable to use greater than the minimum effective amount of acrylate-functional siloxane units to obtain a higher degree of wettability as a result of having a greater number of such units dispersed over the lens surface area. The upper limit for the amount of acrylate-functional siloxane units is limited only by the amount of other siloxane units such as those bearing the aliphatically unsaturated hydrocarbon units and silicon-bonded hydrogen radicals which are necessary to produce a cured resin. As a practical matter, an upper limit of about 30 mole percent of such arcylate-functional siloxane units will generally be sufficient to produce a hydrophilic and inherently wettable cured polysiloxane resin. In balancing the wettability characteristics of the cured polysiloxane resin with the desire for high oxygen permeability and good physical properties, it is preferred that from about 10 to 20 mole percent of the total moles of silicon atoms present in the mixture of (A) and (B) above be acrylate-functional siloxane units so that from 80 to 90 mole percent of the silicon atoms in the mixture of (A) and (B) are free to contain other substituents such as phenyl radicals to improve strength and hardness and methyl radicals to improve oxygen permeability. As a result, a formulator has a much wider formulation latitude than would be the case for the acrylate-functional polysiloxane resins described in U.S. Ser. No. 376,450 above which require at least 30 mole percent of such acrylate-functional siloxane units. Since a sufficient amount of cross-linking agent to react with the acrylate-functional radicals is not included in the compositions of the present invention and additional aliphatically unsaturated hydrocarbon radicals are employed to effect curing of the compositions, it is best to limit the amount of acrylate-functional siloxane units to less than 30 mole percent for reasons of formulation latitude and because compositions containing more than 30 mole percent of such acrylate-functional siloxane units can be cured to form inherently wettable compositions per se as described in U.S. Ser. No. 376,450 above.

As can be seen from the above formula, an acrylate-functional siloxane unit is meant to be a siloxane unit bearing an acryloxyalkyl (R is —H) or a methacryloxyalkyl (R is —CH$_3$) radical. Combinations of both types of siloxane units can also be present in the polysiloxane compositions of the present invention.

The divalent alkylene radical R' is free of unsaturation and contains 1 to 4 inclusive carbon atoms. Examples of R' include —CH$_2$—, —CH$_2$CH$_2$—, —CH$_2$CH$_2$CH$_2$—, —$CH_2$CH(CH$_3$)—, —CH$_2$CH$_2$CH$_2$CH$_2$—, —CH$_2$CH$_2$CH(CH$_3$)— and —CH$_2$CH(CH$_2$CH$_3$)—. Siloxane units wherein the R' radical is —CH$_2$CH$_2$CH$_2$— are preferred because of their ease of preparation and commercial availability and also because they tend to produce a more hydrolytically stable acrylate-functional siloxane unit than most of the other types of R' radicals described above. Siloxane units wherein R is methyl are preferred.

The acrylate-functional polysiloxane composition must contain a sufficient amount of aliphatically unsaturated radicals selected from the group consisting of vinyl, allyl and butenylene radicals such that the cured resin has the desired flexural strength value, i.e., a flexural strength value at 21°±2° C. in the unhydrated state of at least 3,500 p.s.i., because it is the object of the present invention to use the acrylate-functional siloxane units solely for their contribution to wettability. The butenylene radical is —CH=CHCH$_2$CH$_2$— or —CH$_2$CH=CHCH$_2$— and appears in the form of silacyclopentenyl siloxane units, i.e.,

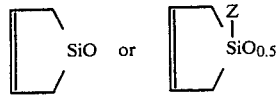

where Z can be, for example, an alkyl radical such as a methyl radical, see U.S. Pat. No. 3,509,191 (Atwell, issued Apr. 28, 1970). The aliphatically unsaturated hydrocarbon radical of choice is the vinyl radical for reasons of commercial availability and preferably such radicals are present on from 15 to 30 mole percent of the total silicon atoms present in said (A) and (B), there being no more than one vinyl radical per silicon atom.

Since (A) is a polysiloxane composition, the siloxane units contain divalent oxygen radicals linking one silicon atom to another and essentially any remaining silicon-bonded substituents present in the acrylate-functional polysiloxane composition of (A) are selected from the group consisting of alkyl radicals of from 1 to 3 inclusive carbon atoms and phenyl radicals. Specific examples of siloxane units which can be employed herein are monophenylsiloxane, phenylmethylsiloxane, diphenylsiloxane, diphenylmethylsiloxane and phenyldimethylsiloxane, monomethylsiloxane, dimethylsiloxane, and trimethylsiloxane. In lieu of the methyl radical in any of the above units, one can employ for example the alkyl radicals ethyl, n-propyl or isopropyl. Preferably, the remaining substituents present in the composition (A) are methyl and phenyl radicals. It is best to use no more than the minimum amount of aliphatically unsaturated hydrocarbon radicals needed to obtain the desired physical properties such as flexural strength after curing.

The acrylate-functional polysiloxane composition can be at least one random copolymer, terpolymer or greater combination of siloxane units containing the above siloxane units or it can be what is sometimes referred to as a "block copolymer" composed of "blocks" of siloxane units such as polydimethylsiloxane blocks containing, for example, 2-10 siloxane units per block and $H_2C = CRCOOR'SiO_{1.5}$ units. Preparation of such block copolymers by various methods is known in the art as can be seen from an examination of U.S. Pat. No. 3,878,263 to Martin (issued Apr. 15, 1975) which is hereby incorporated by reference to show one method for making such block copolymers. A simpler and more conventional manner of preparing such block copolymers is to use polysiloxanes in the manner outlined in column 5, line 59 to column 6, line 4 of the Baney et al. U.S. Pat. No. 4,035,355 (hereby incorporated by reference) wherein the required amount of aliphatically unsaturated silanes or siloxanes are also included in the formulation. It is known that polydiorganosiloxane blocks which contain a relatively large number of siloxane units per block tend to render the cured composition softer and more flexible, therefore the compositions selected should be those which cure to a hard polysiloxane resin having the physical properties described herein. Use of large amounts of triorganosiloxy units can also detrimentally effect the flexural strength values of the cured resin and should be avoided.

At present, a random polymer manufactured by an equilibration method from acrylate-functional silanes and acrylate-free silanes using well-known techniques such as the hydrolysis and condensation of the appropriate chlorosilanes and alkoxysilanes under acidic conditions followed by the equilibration of the composition formed employing base catalysis is considered to be the simplest and best method of preparing acrylate-functional polysiloxane compositions useful in preparing the compositions and devices of the present invention. The following Examples will shown the method employed to produce such compositions.

The curable compositions of the present invention contain two major components wherein component (A) is an acrylate-functional polysiloxane composition and component (B) is an organosilicon cross-linking agent containing an average of at least two silicon-bonded hydrogen radicals per molecule. The compositions also include a third component (C) which is a catalyst that is added prior to curing the composition.

Component (B) can be at least one of a number of well-known organosilicon compounds or polysiloxanes which, when taken as a whole, is an agent which possesses an average of at least two $\equiv SiH$ units per molecule. Examples of such compounds and polysiloxanes can be found in U.S. Pat. Nos. 2,915,497 (Clark, issued Dec. 1, 1959) and 3,697,473 (Polmanteer, et al., issued Oct. 10, 1973) which are hereby incorporated by reference to teach compounds and polysiloxanes useful as cross-linking agents. Specific examples of cross-linking agents are: $HMe_2SiO(Ph_2SiO)SiMe_2H$; $(HMe_2SiO)_3SiPh$; $(HMe_2SiO)_4Si$ and a polysiloxane containing an average of 10 mole percent $Me_3SiO_{0.5}$ units, 55 mole percent MeHSiO units and 35 mole percent $Ph_2SiO$ units wherein the abbreviations used above and hereafter have the following meanings: Me for Methyl, Ph for Phenyl and hereafter, Vi for Vinyl and Bu for Butyl.

In formulating components (A) and (B), the mole percentage of acrylate-functional siloxane units to be present in the cured mixture is selected to fall within the aforementioned range and such units are treated as being monosubstituted siloxane units which do not participate in the cross-linking or curing reaction. Substituents are selected for the remaining silicon atoms present in (A) and (B) in accordance with well-known silicon resin formulating techniques such that no greater than a 1:1 ratio of silicon-bonded hydrogen radicals to total moles of said aliphatically unsaturated radicals (excluding $H_2C=CRCOOR'-$ radicals) is present in the mixture of (A) and (B). A composition which is curable to a resin having the aforementioned properties is obtained after an appropriate amount of the hereinafter described Group 8 Transition Metal catalyst is added.

As is well known in the art, the mole percentage of the aliphatically unsaturated hydrocarbon radicals (other than the acrylate-functional radicals) present in the acrylate-functional polysiloxane composition to be cured and the type of siloxane unit to which such radicals are attached will determine the type and amount of the above-described organosilicon cross-linking agent to be employed.

Since silanol ($\equiv$SiOH) radicals can react with silicon hydride ($\equiv$SiH) radicals to form a gas and the presence of gas bubbles in the cured resin can destroy the optical clarity of the cured polysiloxane resin, the silanol content of the polysiloxanes must be minimized using well-known techniques (e.g., blocking the silanol radicals with trimethylsiloxy units).

The catalyst which is to be employed to cure the mixture of components (A) and (B) is one which catalyzes the addition of the silicon-bonded hydrogen radical found in the cross-linking agent (B) of the aliphatically unsaturated hydrocarbon radicals found in component (A). Transition Metal Elements from Group 8 of the Periodic Table of the Elements such as platinum, palladium and rhodium are known to be useful for this purpose. To be useful in curing the compositions of the present invention, the Group 8 Transition Metal catalyst must be one which preferentially catalyzes the addition of the silicon-bonded hydrogen radicals to the aliphatically unsaturated radicals instead of addition to the unsaturation ($>C=C<$ portion) found in the acrylate-functional siloxane units. As a result of this preferential reaction, it is believed that a sufficient amount of acrylate-functional radicals remain unreacted upon curing the composition to render the cured polysiloxane resin hydrophilic when only a sufficient amount of cross-linking agent has been included in the composition to stoichiometrically react with the aliphatically unsaturated hydrocarbon radicals (e.g., $\equiv$SiVi) other than those present in the acrylate-functional siloxane units. Platinum has been found to be a useful, readily available and preferred Group 8 Transition Metal catalyst for this purpose. Reaction with the unsaturation present in the acrylate-functional siloxane units also appears to be possible because inclusion of a sufficient amount of cross-linking agent to stoichiometrically react with all of the aliphatic unsaturation present in the acrylate-functional polysiloxane compositions results in cured polysiloxane resins which are not hydrophilic for the purposes of this invention.

For the purposes of this invention, the platinum or other Group 8 Transition Metal catalyst can be in any catalytically effective form such as, for example, the finely divided metal per se or organic, inorganic or organosilicon compounds or complexes of such Transition Metal elements. Examples of platinum catalysts can be found in U.S. Pat. Nos. 3,419,593 (Willing, issued Dec. 31, 1968) and U.S. Pat. No. 3,631,220 (Wojdac, issued Dec. 28, 1971) which are hereby incorporated by reference to teach examples of useful catalysts and the amounts to be used. The following platinum catalyst has been successfully used at a level of ten parts per million of platinum metal based upon the total weight of components (A) and (B): $[Bu_3PPtCl_2]_2$ where Bu is a butyl radical.

When all of the components are mixed together, the total polysiloxane composition obtained after mixing should contain an effective amount of $H_2C=CRCOOR'SiO_{1.5}$ units to obtain a cured resin which is hydrophilic and, especially when the intended use of the resin is for an optical device such as an eye contact lens, inherently wettable by human tear fluid after hydration. The effective amount of acrylate-functional siloxane units for the latter use can be determined empirically by testing a contact lens of such a resin on the eye of a wearer as was previously described, but the amount will generally be at least 7 mole percent of the total mixture of (A) and (B) based upon the total moles of silicon atoms present in that mixture.

The physical properties of the cured resin will be affected by various factors such as the mole percentage of acrylate-functional siloxane units, the type and amount of siloxane units bearing aliphatically unsaturated hydrocarbon radicals, the amount and types (di-functional, trifunctional, polyfunctional) of crosslinkers and the types and mole percentages of siloxane units bearing radicals other than acrylate-functional or aliphatically unsaturated hydrocarbon radicals. A cured resin having a measurable flexural strength which is less than 3,500 p.s.i. (pounds per square inch) is generally considered to be rather weak and that flexural strength is about the lower limit for use as a hard eye contact lens. Cured resins having a flexural strength of greater than 5000 p.s.i. and a durometer value of at least 60, and preferably more than 70, on the Shore D scale in the unhydrated state at 21°±2° C. generally have sufficient strength and toughness to be lathe machined into eye contact lenses. Acrylate-functional polysiloxane compositions having a flexural strength of greater than 3,500 p.s.i. can be molded into the lens shape desired. The Shore D durometer of at least 60 in the unhydrated state is also indicative of a "hard resin" versus a flexible elastomeric cured polysiloxane. Flexible materials generally possess a flexural strength which is not measurable because the sample is too weak to resist the force being applied by the test instrument. Generally, the calculated ratio of total organic radicals, excluding any aliphatically unsaturated hydrocarbon radicals (but including the acrylate-functional radicals which are not intended to participate in the cross-linking reaction) radicals, to total silicon atoms present in the acrylate-functional polysiloxane composition (i.e., the degree of substitution or D.S.) should fall within the range of about 1.0 to about 1.7 with a preferred range being between 1.2 to 1.6 inclusive. For eye contact lens uses, it is also preferable to have the ratio of the tangent modulus to the secant modulus to be about 2:1 or more. For example, one can substitute the desired amount of acrylate-functional siloxane units for an equivalent amount of siloxane units in the base resin of a platinum-catalyzed, two component phenylpolysiloxane compsition of the type taught in the Birdsall, et. al. Patent and thereafter modify the siloxane unit composition of the base resin in a known manner to obtain the desired physical properties in the cured resin.

By employing formulation techniques generally familiar to those skilled in the formulation of silicone resins containing aliphatically unsaturated hydrocarbon radicals, one can select an appropriate combination of siloxane units to produce an acrylate-functional polysiloxane composition which is curable to a resin useful in preparing the cured resins and the optical devices of the present invention.

It is important that all components of the polysiloxane compositions of this invention (including the catalyst, reactive diluents, polysiloxanes, etc.) be compatible. Otherwise the cured resin will be cloudy, non-uniform and unfit for use as an optical device although it may have other uses which do not require optical clarity.

To prepare lenses, the acrylate-functional polysiloxane composition is thoroughly mixed with the organosilicon cross-linking agent component followed by the Transition Metal catalyst if it has not already been included in one of the components of the composition. The catalyzed composition is poured into a cylindrical mold and then cured at temperatures ranging from 40° C. to 200° C., preferably from 40° C. to 150° C. to avoid loss of volatile components, for times ranging between 5 and 500 hours, preferably in as short of a period of time as possible to suit the time constraints placed on commercial processes. It is preferable to cure the polysiloxane composition and then post cure the cured resin rod, e.g., the polysiloxane composition is first cured at a temperature of up to 100° C. for up to 16 hours, the cured resin rod is then removed from the mold and post cured at 150° C. for 48 hours followed by 72 hours at 100° C. The first curing process is done at a lower temperature to reduce potential loss of volatile unreacted polysiloxanes and the post cure insures that the polysiloxane composition is cured. Post curing also has the effect of reducing stresses in the cured resin resulting from the cure state and can improve the optical clarity and stabilize the physical properties of the cured resin. To improve the release of the cured cylinder of resin from the mold, it can be preferably to treat the mold surfaces with a conventional silicone mold release agent (e.g., DOW CORNING ® 20 Compound, a product of Dow Corning Corporation) prior to use. The cured rods are then formed into buttons approximately 0.5 inches (12.7 mm) in diameter and 0.187 inches (4.7 mm) in thickness when the cured resin is to be fabricated into lenses by conventional lathing or grinding techniques of the type which are presently employed with hard lens materials. The lenses are then polished and an appropriate edge contour is placed on the lens using conventional techniques. Alternatively, the catalyzed polysiloxane composition is placed in a lens mold which is then closed and the polysiloxane composition can then be cured by heating. To maintain surface wettability, it is highly desirable to avoid the use of polishing compounds, solvents, grinding coolants, lens blocking compounds and any other materials which contain an oily or greasy material which could leave deposits that would render some or all of the lens surfaces hydrophobic.

Thus, when a cured polysiloxane resin is to be employed in manufacturing an optical device of the present invention, particularly for use as an eye contact lens, it is preferred that the silicon-bonded substituents present in the acrylate-functional polysiloxane component (A) and in the organosilicon cross-linking agent (B) are essentially composed of $H_2C=CRCOOR'—$, vinyl radicals, hydrogen radicals, divalent oxygen radicals, methyl radicals and phenyl radicals, there being one more than one vinyl radical per silicon atom and the mole percentage of silicon atoms containing vinyl radicals is from 15 to 30 mole percent of the total moles of silicon atoms present in the aforementioned components (A) and (B). Preferably, the phenyl radical to silicon atom ratio of the mixture of components (A) and (B) is in the range of 0.2 to 0.7 to obtain a reasonably good balance of physical properties such as flexural strength and modulus values. The methyl radical to silicon atom ratio of the mixture of components (A) and (B) is preferably at least 0.6 so that the cured polysiloxane resin has a calculated open eye EOP of at least 10 percent at 0.1 mm thickness to render the lenses suitable for extended wear use. More preferably, the mole percentage of $H_2C=CRCOOR'SiO_{1.5}$ units present in the total mixture of (A) and (B) is in the range of 10 to 20 mole percent, R is a methyl radical and R' is a $—CH_2CH_2CH_2—$ radical. For reasons of commercial availability, the preferred organosilicon cross-linking agents are selected from the group consisting of $HMe_2SiO(Ph_2SiO)SiMe_2H$, $(HMe_2SiO)_3SiPh$, $(HMe_2SiO)_4Si$ and a polysiloxane containing an average of 10 mole percent $Me_3SiO_{0.5}$ units, 55 mole percent $MeHSiO$ units and 35 mole percent $Ph_2SiO$ units. For eye contact lens use, it is preferred that the advancing water-in-air contact angle be as low as possible without compromising the physical properties and oxygen permeability of the cured resin. Use of larger mole percentages of acrylate-functional siloxane units generally expected to result in improved surface wettability and lower water contact angle.

Like conventional polymethylmethacrylate hard contact lenses, it is not preferable to place a dry eye contact lens of the present invention on the cornea of a wearer. Hard polymethylmethacrylate contact lenses are generally provided to an eye care practitioner in a sealed, dry package. After dispensing, it is a recommended, but not always followed, practice to store the lenses in a hard contact lens soaking solution (generally a sterile isotonic aqueous saline solution having a pH of about 7.4 which may further contain disinfectants to sterilize the lens surfaces) when the lenses are not being used. Dry or improperly soaked lenses tend to be less wettable than hydrated lenses which have been soaked, stored and/or immersed in aqueous solution and tend to irritate the wearer's eye until they become "wetted". A hard contact lens wetting agent solution is also often placed on the lens just prior to placement on the cornea to initially render the lens more comfortable to wear. The wetting solution is removed from the surface of the contact lens in a short while by the normal flow of tears above and below the lens, yet the polymethylmethacrylate lens can be worn by many wearers for periods of 8 hours or more without losing its hydrated, wettable state.

Contact lenses of the present invention appear to require handling similar to that described above for polymethylmethacrylate lenses before placement on the eye. It was found that the dry (unhydrated) polysiloxane resin does not possess an advancing water-in-air contact angle of no greater than 80° at room temperature and are therefore not inherently wettable by human tear fluid until the surfaces of the resin have been hydrated, i.e., equilibrated in an aqueous medium. The best way to hydrate the lenses so that they possess an advancing water-in-air contact angle of no greater than 80° and are therefore ready to be placed on the eye is to heat the lenses immersed in an aqueous (distilled water or isotonic saline solution) medium to about 80° C. in a contact lens heat disinfector according to the directions of the manufacturer until they are sterile (about 30 minutes). The lenses should then be hydrated and ready to be worn. Even when the lenses exhibit an advancing water-in-air contact angle of 80° or less in the unhydrated state, it is preferably to hydrate the lenses before they are worn. The lenses should thereafter be maintained in a hydrated condition by storing the lenses in sterile isotonic aqueous saline solution or in a commercially available aqueous contact lens storing or soaking solution during the time that the lenses are not being worn on the eye. It may also be possible to hydrate the lenses simply by storing them in one of the aforementioned media or solutions for a sufficient period of time (several days to a few weeks) to allow the lens surfaces to become hydrated.

Since governmental regulations require that eye contact lenses be provided in a sterile form by the manufacturers, the lenses of the present invention can be supplied in a sterile isotonic saline solution and by storing the lenses in an aqueous contact lens soaking solution, the lenses are expected to remain wettable and comfortable to wear. Periodic hydration by heating in a contact lens disinfector as described above may be preferable. Some wearers may desire to periodically use commercially available wetting solutions or comfort drops for more comfortable wear. It is of course recognized that other factors may cause a lens of the present invention to lose its inherent wettability. For example, any wettable lens may gradually lose its wettability due to the formation of protein and/or lipid deposits on the lens surfaces during wear and these deposits must be removed from time to time such as through the use of conventional hard contact lens cleaning solutions. One advantage which lenses of the present invention have over hydrophobic lens materials which are surface treated to render the surfaces wettable is that the former can be vigorously cleaned and even repolished to remove such deposits since there is no danger that that cleaning or polishing operations will expose a hydrophobic portion of the lens and thereby necessitate a subsequent treatment of the lens surface to render the surface completely wettable. As noted earlier, some persons may desire that the lenses be surface-treated to further improve their wettability. Such surface-treated lenses still possess the advantage of having a hydrophilic lens surface exposed if they are scratched during use.

Another advantage of the lenses of this invention is their relatively high degree of oxygen permeability. Percent Equivalent Oxygen Performance (EOP) in the open eye is a very good way of determining the actual performance of an eye contact lens material and this method is described in column 4, line 12 through column 5, line 33 of the Birdsall, et al. patent. The method for calculating EOP described in column 4, line 31 through column 5, line 33 is the best way to obtain reasonably accurate comparisons of the EOP of resin materials and is the method to be used in determining the EOP values of the resins used in the present invention. The gas permeability coefficient or "DK" value (i.e., the product of the diffusion coefficient (D) and the solubility coefficient (K) of the gas (in this case oxygen gas) in the subject material is the "DK" value at a specified temperature of measurement) can also be calculated for a cured resin using the oxygen gas permeability coefficient value obtained using the "Dow Cell" method described in ASTM D1434-75.

In the Examples, the flexural strengths, tangent modulus and secant modulus of the cured resins were determined on a table model Instron Universal Testing Instrument having a 2 inch (5.08 cm) span flex test fixture using a chart speed of 2 inches (5.08 cm) per minute and a crossarm speed of 0.2 inches (0.51 cm) per minute. A cylindrical rod of each cured resin that was 10 millimeters (mm) in diameter and 75 mm in length was used in making the above strength and modulus measurements.

The hardness of the cured resin was measured on a ½ inch (1.27 cm) thick disk having a diameter of ½ inches (1.27 cm) using a Shore D maximum reading quadrant style Durometer at 21°±2° C. Measurements were taken on both sides of the disk and averaged.

The advancing water-in-air contact angles were measured using a sessile drop method at 21°±2° C. on unhydrated (dry) and hydrated samples of the cured resins using distilled water. The instrument used was a NRL Contact Angle Goniometer, Model No. A-100 which is a product of Rame-Hart, Inc., Mountain Lake, NJ.

All parts reported in the following Examples are parts by weight and all percentages reported with reference to siloxane units are mole percent unless otherwise specified.

In addition to being useful as lenses for contact with or inside of the eye, resins obtained by curing the above-described compositions or mixtures can also find use as lenses for eyeglasses, membranes for gas separations or in other applications where a gas permeable, hard material is needed.

The following Examples are illustrative only and should not be construed as limiting the invention which is properly delineated in the appended claims.

EXAMPLE 1

This Example illustrates the preparation of an acrylate-functional polysiloxane composition and a curable composition of the present invention.

An acrylate-functional polysiloxane composition was prepared as follows. About 3000 grams (g) of distilled water were measured into a 3-necked, 12 liter round bottom boiling flask having a bottom drain. The boiling flask was fitted with a 4-liter addition funnel, thermometer, a water-cooled reflux condenser and an air motor-powered stirring rod having a TEFLON® stirring paddle (TEFLON® is a registered trademark of the E.I. DuPont de Nemours Company). 297.6 g of gamma-methacryloxypropyltrimethoxysilane, 309.6 g of dimethyldichlorosilane, 1142.6 g of phenylthrichlorosilane, 338.4 g of methylvinyldichlorosilane, 141.1 g of diphenyldichlorosilane and 2124 g of reagent grade toluene were combined in the addition funnel. The stirrer and condenser cooling water were started and the mixture in the addition funnel—about 4000 milliliters (ml)—was added to the water in the flask below over a period of about twelve minutes. The temperatures in the flask at the beginning of the addition was about 22° C. and at the end of the addition period, the temperature had risen to 84° C. After the addition was completed, the resulting mixture was stirred for one-half hour, the stirring was stopped and the organic toluene and acidic aqueous phases were allowed to separate. After the phases were well separated, the lower acidic aqueous layer was drained off and discarded. About 4000 ml of hot (80° C.) distilled water was added, with stirring, to the flask containing the toluene phase. After the addition was completed, stirring was stopped and the two phases were again allowed to separate and the aqueous phase was drained off. This washing process was repeated at least four times until the pH of the separated aqueous phase was about the same as that of the distilled water. The toluene phase containing the methacrylate-functional polysiloxane was then transferred to a 3-necked, 5 liter round bottom flask and weighed. The weight of the material was found to be 1343 g and the expected weight was 1416 g for a 94.5% yield.

The flask containing the toluene phase was fitted with a thermometer, an air motor-powered stirrer with a TEFLON® stirring paddle, a Dean-Stark trap fitted with a water-colled reflux condenser and a heating mantle. Ten grams of an aqueous solution containing 10 weight percent of potassium hydroxide was added to the toluene phase with stirring and the mixture was heated to 110° C. Water was removed from the mixture by means of the Dean-Stark trap until the amount of water being recovered was minimal, thereafter the contents of the flask were refluxed at about 110° C. for an additional two hours. The contents of the flask were then cooled to room temperature, a small amount (several grams) of trimethylchlorosilane was added, with stirring, to the contents of the flask until a piece of pH indicator paper indicated that the contents of the flask were acidic. About a half cup of acid-washed CELITE® diatomaceous earth (a filtering aid which is a product of Johns-Manville Products Corp.) was then added to the contents of the flask. The contents of the flask were then filtered through a 10–15 micron sintered glass filter funnel. The filtered material was then transferred to a 3-necked, 5 liter flask fitted with thermometer, air motor-powered stirrer having TEFLON® stirring paddle, a water-cooled stirrer bearing, a water-cooled condenser with a vacuum adaptor and a 1 liter collection flask to recover the toluene. The apparatus was connected to a vacuum source, a heating mantle was placed beneath the 5 liter flask and a dry ice/acetone bath was placed over the collection flask. The vacuum source was opened and after the boiling mass in the 3 liter flask was under control, the flask was slowly heated to 95° C. over an hour period. The collection flask was emptied periodically. Upon reaching 95° C., the heat source was removed when the recovery of material in te collection flask had ceased and the acrylate-functional, specifically a methacrylate-functional, polysiloxane composition was recovered from the 5 liter flask. That polysiloxane composition was a random copolymer having a composition of about 10 mole percent of $H_2C=C(CH_3)COOCH_2CH_2CH_2SiO_{1.5}$ (hereinafter referred to as "$MAPSiO_{1.5}$") units, 45 mole percent of $PhSiO_{1.5}$ units, 25 mole percent of $MeViSiO$ units, 15 mole percent of Me$_2$SiO units and 5 mole percent of Ph$_2$SiO units (hereinafter referred to as "Composition A").

A curable composition was then prepared by thoroughly mixing the following components together: 100 parts by weight of Composition A and 23 parts by weight of the organosilicon crosslinking agent (HMe$_2$SiO)$_3$SiPh. To produce a curable composition containing 10 parts per million of platinum metal, 0.25 parts of a toluene solution containing 0.954 weight percent of [Bu$_3$PPtCl$_2$] catalyst was thoroughly admixed with 100 parts of the above mixture of methacrylate-functional polysiloxane composition and cross-linking agent. The catalyzed composition only containing a sufficient amount of cross-linking agent to stoichiometrically react with the molar amount of vinyl radicals present in the catalyzed composition.

EXAMPLE 2

This Example illustrates the production of a corneal (eye) contact lens of the present invention. The catalyzed composition described in Example 1 was placed in cylindrical molds having inner diameters of one half inch (1.27 mm) (for lenses) and 10 mm (for physical property testing) and cured according to the following procedure. The molds were placed in a programmable heat cycle oven at room temperature and, over a total period of 16 hours: the oven was heated to 100° C., maintained at 100°. C. for two hours, and then cooled to room temperature. The cured rods were removed from the oven and taken out of the molds. The cured rods were then post cured in an oven for 2 days at 150° C. followed by 3 days at 100° C. The resulting optically clear cured polysiloxane resin was calculated to contain 7.5 mole percent of MAPSiO$_{1.5}$ units based upon the total moles of siloxane units present in the cured resin, had a calculated phenyl radical to total silicon atom (PH/Si) ratio of 0.48 and had a calculated methyl radical to total silicon atom (Me/Si) ratio of 0.79. The calculated degree of substitution or D.S. value (previously defined above) of the cured polysiloxane resin was 1.34. The cured resin had the following average physical properties measured at 21°±2° C.: flexural strength—6,500 p.s.i.; tangent modulus—120,000 p.s.i.; secant modulus—60,000 p.s.i. and durometer value (Shore D scale—unhydrated)—80. The advancing water-in-air contact angle measured on a dry (unhydrated) sampel of the cured resin was 90° and after being placed in distilled water in a commercial contact lens disinfector and heated to approximately 80° for about 30 minutes, the measured advancing water-in-air contact angle was found to be 78°. The oxygen gas permeability coefficient (DK value) for the cured polysiloxane resin reported by an independent outside laboratory was $13.9 \times 10^{-10}$ (cm$^3$.cm)/(cm$^2$.sec.cm Hg) at 20° C. which corresponds to a calculated open eye EOP value of 13.2% at 0.1 mm thickness. The measured DK value at 35° C. and open eye EOP value calculated therefrom were $20.8 \times 10^{-10}$ (cm$^3$.cm)/(cm$^2$.sec.cm Hg) and 16.1 at 0.1 mm thickness, respectively. Standard toxicological testing of the cured polysiloxane material indicated that the resin was biocompatible.

EXAMPLE 3

The following compositions were prepared to show the effect of the use of various levels of acrylate-functional siloxane units on the wettability of the cured polysiloxane resins and the effect on wettability of including a sufficient level of cross-linking agent to stoichiometrically react with all of the acrylate-functional and vinyl-functional siloxane units present in the polysiloxane compositions to be cured. Three acrylate-functional polysiloxane compositions were prepared in the same manner as was described in Example 1. Composition B contained 5 mole percent of MAPSiO$_{1.5}$ units, 45 mole percent of PhSiO$_{1.5}$ units, 25 mole percent of MeViSiO units, 15 mole percent of Me$_2$SiO units and 10 mole percent of Ph$_2$SiO units. Composition C differed from Composition B only in that it contained 10 mole percent of MAPSiO$_{1.5}$ units and 40 mole percent of PhSiO$_{1.5}$ units. Likewise Composition D differed from Composition B only in that it contained 15 mole percent of MAPSiO$_{1.5}$ units and 35 mole percent of PhSiO$_{1.5}$ units. Three curable compositions were prepared as described in Example 1 by mixing 100 parts by weight of Compositions B, C and D, respectively, together with 23 parts of the organosilicon cross-linking agent (HMe$_2$SiO)$_3$SiPh and thereafter ten parts per million of platinum metal was added as described in Example 1. The amount of cross-linking agent was only that needed to stoichiometrically react with the mole percentage of vinyl radicals found in each composition. Each curable composition was cured as described in Example 2 to form a hard, optically clear polysiloxane resin. The physical properties and calculated D.S., Ph/Si ratio, Me/Si ratio and mole percent of MAPSiO$_{1.5}$ units of the cured polysiloxane resins are summarized in Table I below. Also reported are the physical properties of a phenylpolysiloxane resin of the type described in the Birdsall, et al. Patent which is included for purposes of comparison.

Table I also shows the effect on advancing water-in-air contact angle of hydrating the cured resins. Hydration ws carried out as described in Example II. Run No. 1 with the lowest level of MAPSiO$_{1.5}$ units in the series is a comparative example since the advancing water-in-air contact angle did not decrease upon hydration to a value less than or equal to 80° while Run No. 2 did. Run No. 3 with the highest level of MAPSiO$_{1.5}$ units in the series exhibited an advancing water-in-air contact angle of 78° both before and after hydration. Run No. 4 is the Birdsall, et al., resin material which was not surface treated to render it hydrophilic. That material was markedly hydrophobic and exhibited an advancing water-in-air contact angle of 100°+ both before and after hydration.

Run No. 5 was made with Composition E which contained a lower mole percentage of vinyl radicals, but a higher mole percentage of PhSiO$_{1.5}$ units than Composition C. Composition E was prepared in a manner similar to that of Example 1 and contained 10 mole percent of MAPSiO$_{1.5}$ units, 50 mole percent of PhSiO$_{1.5}$ units, 15 mole percent of MeViSiO units, 15 mole percent of Me$_2$SiO units and 10 mole percent of Ph$_2$SiO units. The curable composition used in Run No. 5 was prepared by thoroughly mixing 100 parts of Composition E with 13.08 parts of the organosilicon cross-linker (HMe$_2$SiO)$_3$SiPh and thereafter catalyzing and curing the resulting mixture as in Example 2. Run 5 exhibited an advancing water-in-air contact angle of 80° after hydration and possessed higher flexural strength values and tangent and secant moduli than did Run No. 2 and was closer in physical properties to the Birdsall, et al. material than any of the other Runs in this series.

Comparative Run Nos. 6-9 were a repeat of Run Nos. 1, 2, 3 and 5, respectively, but in each run, the amount of organosilicon cross-linker employed was sufficient to stoichiometrically react with all of the aliphatically unsaturated radicals, including those found in the MAPSiO$_{1.5}$ units. In every case, the advancing water-in-air contact angles of each cured resin exceeded 80° after hydration. This shows that the MAPSiO$_{1.5}$ units must remain unreacted to obtain a wettable cured polysiloxane resin. Based upon the Me/Si ratio, all of the cured resins shown in Table I would be expected to have an open eye EOP value of at least 3 at 0.1 mm thickness at 21°±2° C.

Another comparative run was made using a methacrylate-functional polysiloxane having the following composition: 15 mole percent of MAPSiO$_{1.5}$ units, 50 mole percent of PhSiO$_{1.5}$ units, 10 mole percent of MeViSiO units, 15 mole percent of Me$_2$SiO units and 10 mole percent of Ph$_2$SiO units. The cured polysiloxane resin obtained by mixing 100 parts of this composition with a sufficient amount of (HMe$_2$SiO)$_3$SiPh and 10 parts per million of platinum using the aformentioned catalyst had an advancing water-in-air contact angle of 90° before hydration and 78° after hydration, but only exhibited a flexural strength of 2700 p.s.i. which is too low to be acceptable as a hard eye contact lens material. Another composition of the above type was prepared wherein a sufficient amount of cross-linking agent was used to react with all of the unsaturated radicals. The cured resin exhibited a contact angle of 100° unhydrated and 93° hydrated.

contact lenses that were shipped in water were more acceptable as a whole to the patients than were the four that were shipped dry. Hydrating the contact lenses by placing them in an aqueous (generally distilled water) medium under the conditions described in Example 2 (hereinafter "hydrating") generally improved the wettability of the contact lenses in the eye of the patient. As a test, the lenses that were shipped dry were placed on the cornea after being rinsed with a conventional hard contact lens wetting solution and, for dry lenses, this procedure was generally not found to be acceptable from a wettability or wearing comfort standpoint. Wettability improved for three of the four patients after the contact lenses were hydrated and redispensed.

In this first study, patients were generally examined after 3 days, 7 days, 14 days and one month after dispensing the lenses. In evaluating the wettability, a front surface (tear film) evaporation time ("FSET") of 10 seconds or more on the cornea of a patient was considered as being "good" wettability while an FSET of about 8–10 seconds was judged to be marginally wettable and below that, the lens was judged to be unacceptable in wetting. The presence or absence of areas of non-wetting on the lens surface and the visual acuity and comfort of wear were some factors also taken into consideration in evaluating the inherent wettability and thus, acceptability, of the contact lenses. After 3 days of wear (averaging about 8 hours of wear per day) 6 contact lenses were judged to be good in wettability

TABLE I

| Run No.: | 1 | 2 | 3 | 4 | 5 | 6 | 7 | 8 | 9 |
|---|---|---|---|---|---|---|---|---|---|
| Polysiloxane Composition | B | C | D | (2) | E | B | C | D | E |
| Mole % MAPSiO$_{1.5}$[1] | 3.8 | 7.5 | 11.3 | 0 | 8.3 | 3.6 | 6.8 | 9.8 | 7.5 |
| D.S.[1] | 1.38 | 1.38 | 1.38 | 1.38 | 1.33 | 1.35 | 1.34 | 1.32 | 1.29 |
| Ph/Si Ratio[1] | 0.55 | 0.51 | 0.47 | 0.59 | 0.63 | 0.53 | 0.49 | 0.44 | 0.59 |
| Me/Si Ratio[1] | 0.79 | 0.79 | 0.79 | 0.79 | 0.62 | 0.82 | 0.85 | 0.88 | 0.71 |
| Physical Properties (cured): | | | | | | | | | |
| Unhydrated C/A(°)[3] | 87 | 90 | 78 | 100+ | 93 | 90 | 95 | 90 | 95 |
| Hydrated C/A(°)[3] | 85 | 78 | 78 | 100+ | 80 | 90 | 92 | 87 | 90 |
| Flexural Strength (p.s.i.) | 7000 | 6500 | 6750 | 8000 | 7054 | 6777 | 3740 | 5187 | 5995 |
| Tangent Modulus (p.s.i. × 10$^5$) | 1.41 | 1.22 | 1.36 | 1.70 | 1.63 | 1.36 | 1.00 | 1.20 | 1.26 |
| Secant Modulus (p.s.i. × 10$^5$) | 0.70 | 0.55 | 0.72 | 0.80 | 0.67 | 0.70 | 0.73 | 0.80 | 0.75 |

[1]Based upon total moles of siloxane units in cured polysiloxane resin
[2]Cured phenylpolysiloxane resin of type shown in U.S. Pat. No. 4,198,131 (Birdsall, et al.) - no hydrophilic surface-treatment employed
[3]Advancing water-in-air contact angle at 21° ± 2° C.

EXAMPLE 4

The rods of cured acrylate-functional polysiloxane resin prepared in Example 2 were used to prepare corneal contact lenses utilizing conventional lathe-cutting and polishing techniques. Three studies were performed to empirically evaluated the wettability and acceptability of such contact lenses on a small number of informed volunteer human patients. Each pair of contact lenses was fabricated in accordance with the individual prescription required to correct the vision of the patient. The level of acrylate-functional polysiloxane units present in the cured polysiloxane resin contact lenses (hereinafter "contact lenses") used in this Example (7.5 mole percent) was rather close to the minimum amount required to obtain inherent wettability.

In the first study, a complete initial ocular exam of each patient was made and one pair of contact lenses were dispensed to each of 10 patients. Six pairs of the contact lenses were shipped from the manufacturing site in sterilized vials of distilled water and the other 4 pair were shipped in dry packages. In general, the six pair of and acceptable, 7 contact lenses were judged to be marginally acceptable and 5 contact lenses were judged to be unacceptable due to poor wetting. The remaining 2 contact lenses were dispensed to a patient who did not always follow the prescribed regimen for wear and that subject was excluded from the study. It was noted that some patients could wear one lens which was marginally acceptable while the lens on the other eye simply did not exhibit wettability and would be deemed unacceptable.

Referring to the six "good" lenses, contact lenses, two patients were able to comfortably wear their pairs of lenses for more than two weeks for an average daily wear time of about 8 hours and, at times, the contact lenses were worn overnight on an extended wear basis. Another patient was able to wear one contact lens for 27 days before the lens became clouded due to an accumulation of surface biodebris which the patient was unable to remove. The last lens was judged to be good initially (FSET of greater than 20 seconds), but the patient had some trouble with comfort and after a few days was dropped from the study. Wearing of the remainder of the marginally acceptable lenses was discontinued at various times of up to a month for reasons such as loss of wettability or accumulation of deposits resulting in cloudiness.

One female patient was unable to wear the contact lenses as dispensed to her because they did not appear to be sufficiently wettable on her cornea. She requested that the lenses be surface-treated using the surface-treatment process described in the Gesser, et al. U.S. Pat. No. 3,925,178 because the lenses themselves fit very comfortably on her cornea. The lenses were surface-treated in that manner and the patient wore the surface-treated lenses for more than one month. While a majority of the contact lenses were found to be marginal or non-acceptable in this limited study, it did show that even the minimal level of acrylate-functional siloxane units used in the cured resin resulted in a contact lens which was inherently wettable and acceptable for wear by at least two patients.

In the second study, one pair of contact lenses were dispensed to each of three patients for the purpose of evaluating the lenses with a specific type of hard contact lens conditioning solution to determine whether or not that conditioning solution would improve the wettability of the polysiloxane resin contact lenses being evaluated. Before dispensing, each of the contact lenses were thoroughly cleaned with a hard contact lens cleaning solution identified as having anionic and other surfactants which was sold under the name "The Boston Lens ® Cleaner" by Polymer Technology Corp., Wilmington, Mass. 01887. Each lens was then soaked for at least 12 hours at room temperature in a hard contact lens conditioning solution sold under the name "The Boston Lens ® Conditioning" by Polymer Technology Corp. The first patient exhibited only marginal wetting, comfort and visual acuity with those lenses after one week of wear even though the lenses were hydrated each day and inserted on the eye after being wetted with the above conditioning solution. The second female patient (the same patient who had her lenses surface-treated in the first study) initially exhibited unacceptable wetting (FSET of less than 2 seconds for both lenses). However, after hydrating the lenses on a daily basis and inserting them while they were wetted with the above conditioning solution, the lenses provided good inherent wettability (FSET greater than 15 seconds for each lens), comfortable wear and stable visual correction (20/15 in each eye) for a period of at least 3 weeks. The last patient exhibited minimal to unacceptable wettability upon initial insertion and even after hydration, only one lens was considered to be wettable and wear of the lenses by this patient was discontinued. Thus, at least one of the three patients in this limited study found these acrylate-functional polysiloxane resin contact lenses to be inherently wettable and acceptable.

A third study was conducted to again check the ability of the acrylate-functional polysiloxane resin contact lenses to be inherently wettable and acceptable for contact lens wear. Twelve lenses (six pair) of contact lenses were prepared for six patients. The contact lenses were cleaned and hydrated by placing them in sealed vials filled with distilled water and heating the vials in an oven from room temperature to about 275°–300° F. and back to room temperature over a one hour period before they were dispensed to the patients. Four of the twelve lenses exhibited good wettability at the time of dispensing to the patients while seven did not and one was marginal in wettability. The latter eight were polished, cleaned, hydrated in the same manner as done initially and were redispensed. The wettability of two of the remaining eight lenses was improved and judged to be acceptable while a third lens improved from unacceptable to marginally acceptable. Thus, a total of eight lenses were found to exhibit a sufficient amount of inherent wettability to afford unimpaired visual performance. The lens which improved to the marginally acceptable category was not dispensed for wear while the other seven were dispensed. Of the four patients wearing the seven lenses (one wore a different contact lens in the other eye for the purposes of the study) dispensed, only one was able to wear two of the lenses for more than two days with reasonably good inherent wettability and visual acuity although transient lapses in surface integrity (wettability) were noted by that patient. Wear of three of the contact lenses was discontinued after 1 day due to unacceptable surface-wetting and the other two contact lenses became clouded due to surface biodebris deposits.

The four contact lenses deemed to be unacceptable by the patients for whom the lenses were prescribed were tried on the eyes of other volunteers. One of these four lenses was observed to be inherently wettable on the cornea of a volunteer. Thus only three of the twelve lenses involved in this third study were found to be unacceptable.

The above limited studies show that even with a minimal amount of acrylate-functional siloxane units in the cured polysiloxane resin, the polysiloxane resin contact lenses were inherently wettable and useful as corneal contact lenses.

That which is claimed is:

1. A curable polysiloxane composition consisting essentially of
   (A) 100 parts by weight of an acrylate-functional polysiloxane composition containing acrylate-functional siloxane units of the unit formula $H_2C=CROOR'SiO_{1.5}$ where R is a methyl radical or hydrogen and R' is a divalent alkylene radical of from 1 to 4 inclusive carbon atoms and containing siloxane units possessing aliphatically unsaturated hydrocarbon radicals selected from the group consisting of vinyl, allyl and butenylene radicals, the remaining silicon-bonded substituents in addition to divalent oxygen radicals present in said polysiloxane essentially being selected from the group consisting of alkyl radicals of from 1 to 3 inclusive carbon atoms and phenyl radicals,
   (B) an amount of an organosilicon cross-linking agent containing an average of at least two silicon-bonded hydrogen radicals per molecule, said amount being no greater than that required to provide a 1:1 mole ratio of silicon-bonded hydrogen radicals to total moles of said aliphatically unsaturated hydrocarbon radicals present in (A), essentially any remaining substituents in addition to divalent oxygen radicals present in said agent being selected from the group consisting of alkyl radicals of from 1 to 3 inclusive carbon atoms and phenyl radicals, and
   (C) a catalytic amount of a Group 8 Transition Metal catalyst which preferentially catalyzes the addition of said silicon-bonded hydrogen radicals to said aliphatically unsaturated hydrocarbon radicals instead of the >C=C< portion of the acrylate-functional siloxane units, there being at least a sufficient amount of said aliphatically unsaturated hydrocarbon radicals in (A) such that when the mixture of (A), (B) and (C) is cured to form a resin, said resin possesses a flexural strength value of at least 3,500 p.s.i. at 21°±2° C. in the unhydrated state, there further being an effective amount of said acrylate-functional siloxane units present in (A) such that the cured resin possesses an advancing water-in-air contact angle of no greater than 80° at 21°±2° C. in the hydrated state and wherein less than 30 mole percent of the total moles of silicon atoms present in (A) and (B) are derived from said acrylate-functional siloxane units.

2. The composition as claimed in claim 1 wherein the catalyst is a platinum catalyst and wherein at least 7 mole percent of the total moles of silicon atoms present in the mixture of (A) and (B) are derived from said acrylate-functional siloxane units, said cured resin having an oxygen gas permeability coefficient of at least $2 \times 10^{-10}(cm^3.cm)/(cm^2.sec.cm\ Hg)$ which results in a calculated open eye Equivalent Oxygen Performance value of at least 3 percent at 0.1 mm thickness at 21°±2° C.

3. The composition as claimed in claim 2 wherein the silicon-bonded substituents present in said (A) and (B) are essentially selected from the group consisting of $H_2C=CRCOOR'—$, vinyl radicals, divalent oxygen radicals, methyl radicals and phenyl radicals, and the silicon-bonded substitutents present in said (B) are essentially selected from the group consisting of hydrogen radicals, divalent oxygen radicals, methyl radicals and phenyl radicals, there being no more than one vinyl radical per silicon atom in said (A), the mole percentage of silicon atoms containing vinyl radicals is from 15 to 30 mole percent of the total moles of silicon atoms present in (A) and (B) and the mole percentage of $H_2C=CRCOOR'SiO_{1.5}$ units is less than 30 mole percent of the total moles of silicon atoms present in (A) and (B), the phenyl radical to silicon atom ratio of the total polysiloxane in (A) and (B) is in the range of 0.2 to 0.7 and the methyl radical to silicon atom ratio of the total polysiloxane in (A) and (B) is at least 0.6.

4. The composition as claimed in claim 2 wherein the mole percentage of said acrylate-functional siloxane units based upon the total moles of silicon atoms in both (A) and (B) is in the range of from 10 to 20 mole percent, R is a methyl radical and R' is a $—CH_2CH_2CH_2—$ radical.

5. The composition as claimed in claim 4 wherein the silicon-bonded substituents present in said (A) are essentially selected from the group consisting of $H_2C=C(CH_3)COOCH_2CH_2CH_2—$, vinyl radicals, divalent oxygen radicals, methyl radicals and phenyl radicals, and the silicon-bonded substituents present in said (B) are essentially selected from the group consisting of hydrogen radicals, divalent oxygen radicals, methyl radicals and phenyl radicals, there being no more than one vinyl radical per silicon atom and the mole percentage of silicon atoms containing vinyl radicals is from 15 to 30 mole percent of the total moles of silicon atoms present in both (A) and (B) and the phenyl radical to silicon atom ratio of the total polysiloxane in (A) and (B) is in the range of 0.2 to 0.7, the methyl radical to silicon atom ratio of the total polysiloxane in (A) and (B) is at least 0.6, said (B) is selected from the group consisting of $HMe_2SiO(Ph_2SiO)SiMe_2H$, $(HMe_2SiO)_3$-SiPh, $(HMe_2SiO)_4Si$ and a polysiloxane containing an average of 10 mole percent $Me_3SiO_{0.5}$ units, 55 mole percent MeHSiO units and 35 mole percent $Ph_2SiO$ units wherein Me is a methyl radical and Ph is a phenyl radical.

6. A polysiloxane resin article which comprises the product formed upon curing the composition of claim 1.

7. A polysiloxane resin article which comprises the product formed upon curing the composition of claim 2.

8. A polysiloxane resin article which comprises the product formed upon curing the composition of claim 3.

9. A polysiloxane resin article which comprises the product formed upon curing the composition of claim 4.

10. A polysiloxane resin article which comprises the product formed upon curing the composition of claim 5.

11. As an optical device, a lens to be worn against or inside of the eye, said lens consisting essentially of an optically clear, biocompatible, cured polysiloxane resin having a flexural strength value of at least 3,500 p.s.i. at 21°±2° C. in the unhydrated state, an advancing water-in-air contact angle of no greater than 80° at 21°±2° C. in the hydrated state and an oxygen gas permeability coefficient of at least $2 \times 10^{-10}(cm^3.cm)/(cm^2.sec.cm\ Hg)$ which results in a calculated open eye Equivalent Oxygen Performance value of at least 3 percent at 0.1 mm thickness at 21°±2° C., said resin having been prepared by curing a composition consisting essentially of (A) 100 parts by weight of an acrylate-functional polysiloxane composition containing acrylate-functional siloxane units of the unit formula $H_2C=CROOR'SiO_{1.5}$ where R is a methyl radical or hydrogen and R' is a divalent alkylene radical of from 1 to 4 inclusive carbon atoms and containing siloxane units possessing aliphatically unsaturated hydrocarbon radicals selected from the group consisting of vinyl, allyl and butenylene radicals, the remaining silicon-bonded substituents in addition to divalent oxygen radicals present in said polysiloxane essentially being selected from the group consisting of alkyl radicals of from 1 to 3 inclusive carbon atoms and phenyl radicals, (B) an amount of an organosilicon cross-linking agent containing an average of at least two silicon-bonded hydrogen radicals per molecule, said amount being no greater than that required to provide a 1:1 mole ratio of silicon-bonded hydrogen radicals to total moles of said aliphatically unsaturated hydrocarbon radicals present in (A), essentially any remaining substituents in addition to divalent oxygen radicals present in said agent being selected from the group consisting of alkyl radicals of from 1 to 3 inclusive carbon atoms and phenyl radicals, and (C) a catalytic amount of a Group 8 Transition Metal catalyst which preferentially catalyzes the addition of said silicon-bonded hydrogen radicals to said aliphatically unsaturated hydrocarbon radicals instead of the >C=C< portion of the acrylate-functional siloxane units, there being at least a sufficient amount of said aliphatically unsaturated hydrocarbon radicals in (A) such that when the mixture of (A), (B) and (C) is cured to form a resin, said resin possesses the aforementioned flexural strength value, there further being an effective amount of said acrylate-functional siloxane units present in (A) such that the cured resin possesses the aforementioned water-in-air contact angle and is inherently wettable by the tear fluid of a wearer of such a lens and wherein less than 30 mole percent of the total moles of silicon atoms present in (A) and (B) are derived from said acrylate-functional siloxane units.

12. The device as claimed in claim 11 wherein the catalyst is a platinum catalyst and wherein at least 7 mole percent of the total moles of silicon atoms present in the mixture of (A) and (B) are derived from said acrylate-functional siloxane units.

13. The device as claimed in claim 12 wherein the silicon-bonded substituents present in said (A) and (B) are essentially selected from the group consisting of $H_2C=CRCOOR'-$, vinyl radicals, divalent oxygen radicals, methyl radicals and phenyl radicals, and the silicon-bonded substituents present in said (B) are essentially selected from the group consisting of hydrogen radicals, divalent oxygen radicals, methyl radicals and phenyl radicals, there being no more than one vinyl radical per silicon atom in said (A), the mole percentage of silicon atoms containing vinyl radicals is from 15 to 30 mole percent of the total moles of silicon atoms present in (A) and (B) and the mole percentage of $H_2C=CRCOOR'SiO_{1.5}$ units is less than 30 mole percent of the total moles of silicon atoms present in (A) and (B), the phenyl radical to silicon atom ratio of the total polysiloxane in (A) and (B) is in the range of 0.2 to 0.7 and the methyl radical to silicon atom ratio of the total polysiloxane in (A) and (B) is at least 0.6, said resin having an oxygen gas permeability coefficient of at least $8 \times 10^{-10} (cm^3.cm)/(cm^2.sec.cm\ Hg)$ which results in a calculated open eye Equivalent Oxygen Performance Value of at least 10 percent at 0.1 mm thickness at $21° \pm 2°$ C.

14. The device as claimed in claim 12 wherein the mole percentage of said acrylate-functional siloxane units based upon the total moles of silicon atoms in both (A) and (B) is in the range of from 10 to 20 mole percent, R is a methyl radical and R' is a $-CH_2CH_2CH_2-$ radical.

15. The device as claimed in claim 14 wherein the silicon-bonded substituents present in said (A) are essentially selected from the group consisting of $H_2C=C(CH_3)COOCH_2CH_2CH_2-$, vinyl radicals, divalent oxygen radicals, methyl radicals and phenyl radicals, and the silicon-bonded substituents present in said (B) are essentially selected from the group consisting of hydrogen radicals, divalent oxygen radicals, methyl radicals and phenyl radicals, there being no more than one vinyl radical per silicon atom and the mole percentage of silicon atoms containing vinyl radicals is from 15 to 30 mole percent of the total moles of silicon atoms present in both (A) and (B) and the phenyl radical to silicon atom ratio of the total polysiloxane in (A) and (B) is in the range of 0.2 to 0.7, the methyl radical to silicon atom ratio of the total polysiloxane in (A) and (B) is at least 0.6, said (B) is selected from the group consisting of $HMe_2SiO(Ph_2SiO)SiMe_2H$, $(HMe_2SiO)_3SiPh$, $(HMe_2SiO)_4Si$ and a polysiloxane containing an average of 10 mole percent $Me_3SiO_{0.5}$ units, 55 mole percent $MeHSiO$ units and 35 mole percent $Ph_2SiO$ units wherein Me is a methyl radical and Ph is a phenyl radical, said resin having an oxygen gas permeability coefficient of at least $8 \times 10^{-}(cm^3.cm)/(cm^2.sec.cm\ Hg)$ which results in a calculated open eye Equivalent Oxygen Performance value of at least 10 percent at 0.1 mm thickness at $21° \pm 2°$ C.

16. The device as claimed in claim 11 wherein the device is an eye contact lens.

17. The device as claimed in claim 12 wherein the device is an eye contact lens.

18. The device as claimed in claim 13 wherein the device is an eye contact lens.

19. The device as claimed in claim 14 wherein the device is an eye contact lens.

20. The device as claimed in claim 15 wherein the device is an eye contact lens.

* * * * *